United States Patent
Li et al.

(10) Patent No.: US 12,339,378 B1
(45) Date of Patent: Jun. 24, 2025

(54) HIGH-PRECISION BEIDOU SATELLITE POSITIONING METHOD AND SYSTEM FOR COMPLEX URBAN ENVIRONMENT

(71) Applicant: Guangdong University of Technology, Guangdong (CN)

(72) Inventors: Zhenni Li, Guangdong (CN); Kan Xie, Guangdong (CN); Jianhao Tang, Guangdong (CN); Xin Li, Guangdong (CN); Shengli Xie, Guangdong (CN); Qingsong Yu, Guangdong (CN); Victor Fedorovich Kuzin, Moscow (RU); Kungan Zeng, Guangdong (CN); Qianming Wang, Guangdong (CN)

(73) Assignee: Guangdong University of Technology, Guangzhou (CN)

( * ) Notice: Subject to any disclaimer, the term of this patent is extended or adjusted under 35 U.S.C. 154(b) by 0 days.

(21) Appl. No.: 18/988,779

(22) Filed: Dec. 19, 2024

(30) Foreign Application Priority Data

Jul. 19, 2024 (CN) .......................... 202410969766.4

(51) Int. Cl.
*G01S 19/39* (2010.01)
*G01S 19/40* (2010.01)

(52) U.S. Cl.
CPC ............ *G01S 19/393* (2019.08); *G01S 19/40* (2013.01)

(58) Field of Classification Search
CPC ............................... G01S 19/393; G01S 19/40
See application file for complete search history.

(56) References Cited

U.S. PATENT DOCUMENTS

2023/0401464 A1* 12/2023 Fan ................... G06F 16/735
2024/0219578 A1* 7/2024 Xie ........................ G01S 19/37

FOREIGN PATENT DOCUMENTS

| CN | 110926474 A | 3/2020 | |
|---|---|---|---|
| CN | 113189541 A | 7/2021 | |
| CN | 115952407 A * | 4/2023 | ............. G01S 19/37 |

OTHER PUBLICATIONS

A. Vaswani et al., Attention is All you Need, 31st Conference on Neural Information Processing Systems (NIPS 2017), arXiv, 15 pages, https://arxiv.org/abs/1706.03762 (Year: 2017).*

(Continued)

*Primary Examiner* — Vladimir Magloire
*Assistant Examiner* — Fred H Mull

(57) ABSTRACT

Disclosed is a high-precision BeiDou satellite positioning method and system for a complex urban environment. The method includes the following steps: acquiring measurement data; solving the measurement data based on Kalman filtering before predicting to obtain an initial positioning result; performing graph-based data modeling based on the measurement data to obtain a sky satellite graph; and performing feature extraction on the sky satellite graph based on a Transformer model with a graph-structure perception module, and outputting a position correction value. By using the present disclosure, the positioning accuracy and generalization performance of a positioning model in complex scenarios can be improved. The present disclosure is widely applicable in the field of satellite positioning.

8 Claims, 2 Drawing Sheets

(56) References Cited

OTHER PUBLICATIONS

G. Zhang et al., Prediction on the Urban GNSS Measurement Uncertainty Based on Deep Learning Networks With Long Short-Term Memory, IEEE Sensors Journel, vo. 21(18), p. 20563-20577 (Year: 2021).*

A. Jalalirad et al., GNSS Positioning using Cost Function Regulated Multilateration and Graph Neural Networks, arXiv, https://arxiv.org/abs/2402.18630, Feb. 28, 2024 (Year: 2024).*

F. Wu et al., T-SPP: Improving GNSS Single-Point Positioning Performance Using Transformer-Based Correction, International Journal of Intelligent Systems, vol. 2024, 15 pages, Feb. 29, 2024 (Year: 2024).*

A. Mohanty et al., A Survey of Machine Learning Techniques for Improving Global Navigation Satellite Systems, EURASIP J. Adv. Signal Process, vol. 2024(73), 40 pages, Jun. 28, 2024 (Year: 2024).*

"Unitize." Merriam-Webster.com Dictionary, Merriam-Webster, https://www.merriam-webster.com/dictionary/unitize. Accessed Jan. 24, 2025. (Year: 2025).*

\* cited by examiner

HIGH-PRECISION BEIDOU SATELLITE POSITIONING METHOD AND SYSTEM FOR COMPLEX URBAN ENVIRONMENT

CROSS-REFERENCE TO RELATED APPLICATION

This application claims priority of Chinese Patent Application No. 202410969766.4, filed on Jul. 19, 2024, the entire contents of which are incorporated herein by reference.

TECHNICAL FIELD

The present disclosure relates to the field of satellite positioning, and in particular to a high-precision BeiDou satellite positioning method and system for a complex urban environment.

BACKGROUND

The global navigation satellite system (GNSS) is one of the primary methods widely used in positioning technology. However, in complex urban environments, such as urban canyons and overpasses, GNSS signals are often affected by surrounding environmental factors, leading to significant electromagnetic interference and multipath noise. Although mobile GNSS receivers, such as smartphones, have made significant progress in accuracy and reliability, the mobile GNSS receivers tend to receive more outliers in measurements due to the lower quality of the receiver chips and antennas compared to traditional mainstream GNSS receivers. As a result, the positioning accuracy of the devices are further degraded in such harsh environments.

In recent years, with the rapid development of machine learning, many studies have applied machine learning methods to the field of positioning, aiming to achieve better positioning accuracy through model-based or data-driven post-processing methods. Among these, positioning mathematical observation model-based methods achieve higher accuracy in open environments. However, in urban areas, due to complex electromagnetic interference, signal blockage, and other issues, it is difficult to eliminate observation errors through modeling, resulting in significant positioning deviations and unstable results in model-based methods. Data-driven deep learning methods train neural network models using large amounts of input data to uncover the impact of complex random noise on positioning. The data-driven deep learning methods can address the problem of unmodeled noise that the mathematical observation model-based methods cannot handle, but these methods require a large volume of data for training in the absence of prior knowledge, and the positioning accuracy is low when data samples are limited. Additionally, existing data-driven methods typically only consider the obtained satellite measurements and do not account for the spatial distribution of different satellites in the sky. As a result, these models are unable to fully exploit the implicit spatial relationships between measurements from different satellites, thus affecting the positioning accuracy.

In summary, there is an urgent need for a high-precision positioning method suitable for complex environments.

SUMMARY

In view of this, to address the technical issue of low positioning accuracy in complex scenarios with existing methods, the present disclosure proposes a high-precision BeiDou satellite positioning method for a complex urban environment, the method comprising the following steps:
acquiring measurement data;
performing calculation processing on the measurement data based on Kalman filtering before predicting to obtain an initial positioning result;
performing graph-based data modeling based on the measurement data to obtain a sky satellite graph;
performing feature extraction on the sky satellite graph based on a Transformer model with a graph-structure perception module, and outputting a position correction value; and
combining the initial positioning result and the position correction value to obtain a final positioning result.

The measurement data includes raw pseudorange measurements, satellite position and velocity, Doppler frequency offset, code phase, carrier phase, and the like.

In some embodiments, the method further comprises:
filtering the measurement data.

Through this preferred step, data with better signal quality can be obtained, reducing the computational load and improving positioning efficiency.

In some embodiments, performing calculation processing on the measurement data based on Kalman filtering before predicting to obtain the initial positioning result specifically comprises:
performing prediction for the next moment based on a dynamic model to obtain a predicted position;
constructing a mean-square error (MSE) matrix based on the predicted position;
acquiring an actual measured value; and
adjusting, based on the MSE matrix and the actual measured value, the predicted position using a Kalman filter.

Kalman filtering is a linear minimum variance estimation method, typically applied to non-stationary processes. Kalman filtering uses a recursive approach to extract the estimated information from the measurement information in real time and accumulate the estimated information in the estimated value.

In some embodiments, the graph-based data modeling specifically comprises:
proposing a sky satellite graph for satellite measurement data from different constellations received by a receiver at a certain moment;
taking a position of each satellite as a node in the graph, and concatenating pre-selected data features as node features of the sky satellite graph; and
constructing, based on a cosine similarity-based edge construction method, an adjacency matrix describing spatial structure information of the graph as edges of the sky satellite graph.

The pre-selected data features comprise pseudorange residuals (PR), carrier signal-to-noise ratios (C/NO), and unitized line-of-sight (LOS) vectors.

In some embodiments, performing feature extraction on the sky satellite graph based on the Transformer model with the graph-structure perception module, and outputting the position correction value specifically comprise:
performing Laplace positional encoding based on an adjacency matrix of the sky satellite graph;
fusing the Laplace positional encoding with the node features of the sky satellite graph;
performing graph local structure learning on the sky satellite graph based on the graph-structure perception module to obtain updated node features; and outputting, by a Transformer graph feature extraction module, the position correction value based on relationships between the updated node features.

Through this preferred step, a Laplace positional encoding, which can represent the graph structure information, and a GNN-based structure perception module, capable of learning the local representation of the graph, are added to the Transformer. This maximizes the model's ability to learn both the node feature information and the structural relationships between nodes in the input graph, thereby enabling the learning of relevant features from the constructed sky satellite graph.

In some embodiments, outputting, by the Transformer graph feature extraction module, the position correction value based on the relationships between the updated node features specifically comprises:

learning the relationships between the updated node features from multiple perspectives based on a multi-head attention mechanism layer to obtain output results of the multi-head attention;

successively passing the output results of the multi-head attention through a residual connection, a normalization layer, and an intermediate feed-forward network to obtain outputs of a Transformer unit; and stacking the outputs of the Transformer unit before successively passing through global pooling and a fully connected layer, to output the position correction value. Through this preferred step, potential representations between the nodes of the spatial satellite graph are concerned utilizing the Attention unit in the Transformer map feature extraction module.

In some embodiments, the method further comprises:
pre-training the Transformer model with the graph-structure perception module.

Through this preferred step, the model is trained, and the training process is completed when the iteration rounds reach the set maximum value. The model is then saved and configured to output the position correction value.

The present disclosure further proposes a high-precision BeiDou satellite positioning system for a complex urban environment, the system comprising:

a data acquisition module, configured to acquire measurement data;

an initial positioning module, configured to perform calculation processing on the measurement data based on Kalman filtering before predicting to obtain an initial positioning result;

a satellite graph construction module, configured to perform graph-based data modeling based on the measurement data to obtain a sky satellite graph, a correction module, configured to perform feature extraction on the sky satellite graph based on a Transformer model with a graph-structure perception module, and output a position correction value; and a final positioning module, configured to combine the initial positioning result and the position correction value to obtain a final positioning result.

Based on the above solution, the present disclosure provides a high-precision BeiDou satellite positioning method and system for a complex urban environment, which combines Kalman filtering with data-driven satellite graph structure learning. In the method, initial positioning coordinates are obtained through Kalman filtering; edges are constructed by treating different satellites received by the receiver as different nodes in a topology graph and referring to cosine similarity differences between satellite measurement vectors, to obtain a sky satellite graph with strong structural relationships between nodes. Positional encoding is then applied to integrate the spatial structural relationships between different satellite nodes into the satellite measurement of node features. Finally, a Transformer model with graph structure perception capability is applied to the constructed sky satellite graph. By considering the satellite measurements and the spatial correlations between different satellites, the satellite graph that effectively expresses the relationship between satellite measurement data and spatial positions is obtained, to guide the position correction output from the subsequent pooling layer and fully connected layer. The high-precision positioning based on the position correction improves the positioning accuracy and generalization performance of the positioning model in complex scenarios.

DETAILED DESCRIPTION

Figure 1:
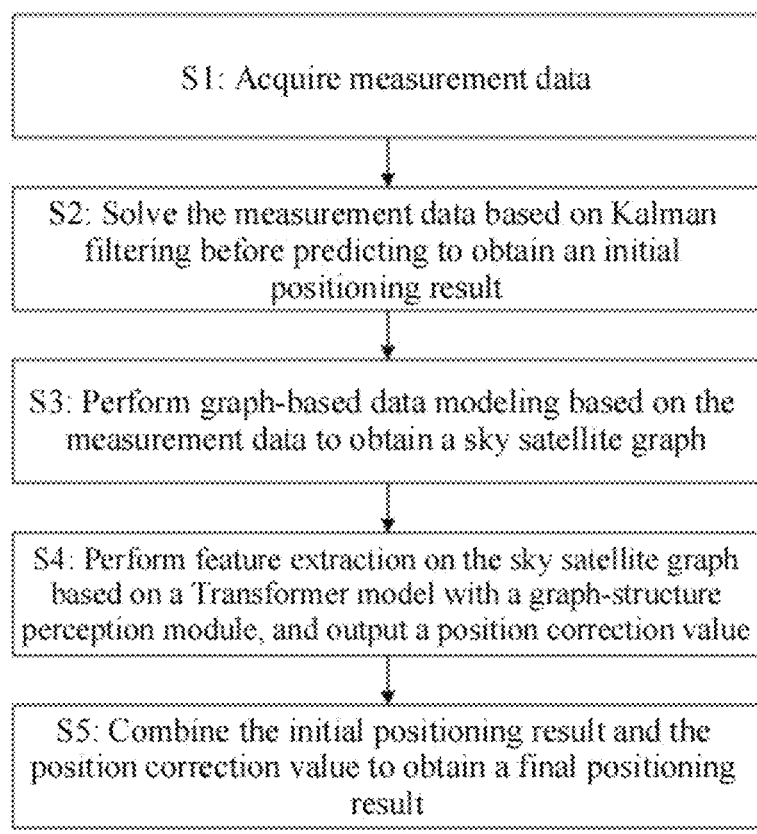
FIG. 1 is a step flowchart of a high-precision BeiDou satellite positioning method for a complex urban environment according to the present disclosure.

The technical solutions in the embodiment of the present disclosure will be described clearly and completely below in combination with the drawings in the embodiment of the present disclosure. Clearly, the described embodiments are not all but only part of embodiments of the present disclosure. All other embodiments obtained by those ordinarily skilled in the art based on the embodiments in the present disclosure without creative work shall fall within the scope of protection of the present disclosure.

It is to be noted that, to facilitate the description, only parts that are relevant to the present disclosure are shown in the drawings. The embodiments and features of the embodiments in the present disclosure may be combined with each other without conflict.

It is to be understood that "system", "apparatus", "unit", and/or "module", as used herein, are methods for distinguishing between different levels of different components, elements, parts, portions, or assemblies. However, these words may be substituted by other expressions if other expressions may achieve the same purpose.

Unless explicitly indicated by the context, the terms "a", "an", "one", and/or "the" are not intended to refer exclusively to the singular form and may also include the plural. In general, the terms "include/comprise", and "contain" are intended to cover only the steps and elements explicitly mentioned, without implying an exclusive list, and a method or apparatus may include additional steps or elements. An element preceded by the phrase "include/comprise a" does not preclude the existence of additional identical elements in the process, method, article, or devices that includes the element.

In the description of the embodiments of the present disclosure, "a plurality of" refers to two or more than two. The following terms "first" and "second" are used for descriptive purposes only and are not to be construed as indicating or implying relative importance or implicitly indicating the number of technical features indicated. Thus, a feature defined as "first" or "second" may explicitly or implicitly comprise one or more of the features.

Additionally, flowchats are used herein to illustrate operations performed by a system according to the embodiments of the present disclosure. It is to be understood that the preceding or subsequent operations are not necessarily performed in the exact order in which they are listed. Instead, the various steps may be processed in reverse order or simultaneously. At the same time, other operations may be added to the processes, or a certain step or several steps may be removed from the processes.

Referring to FIG. 1, the present disclosure proposes a flowchat of an alternative example of a high-precision BeiDou satellite positioning method for a complex urban environment. The method is applicable to a computer device, and the positioning method proposed by the embodiment may comprise but is not limited to the following steps.

At S1, measurement data is acquired.

The design of the present disclosure is based on performing position prediction using GNSS signals received by a smartphone, requiring the collection of the necessary measurement data. First, for the Kalman filtering preliminary positioning module, which requires the use of a linearized pseudorange positioning equation to form a measurement equation group, the primary data collected includes raw pseudorange measurements, satellite position and velocity, Doppler frequency offset, code phase, and carrier phase. For the learning module, the collected features include PR, C/NO, and the LOS vectors from the satellite to the receiver. The PR refers to the difference between the actually-measured pseudorange value and the expected value, which can reflect potential errors in the measurement or positioning estimation. The C/NO indicates the quality of the received signal and provides the learning module with an index to assess the signal's reliability. The LOS vector refers to the unit direction vector from the receiver to the satellite, containing information such as the satellite's elevation angle and azimuth angle.

In addition, based on the use of satellite measurements from the GPS and Galileo positioning systems, satellite measurements from the more accurate BeiDou-2 and BeiDou-3 systems are also incorporated.

At S2, calculation processing is performed on the measurement data based on Kalman filtering before predicting to obtain an initial positioning result.

At S3, graph-based data modeling is performed based on the measurement data to obtain a sky satellite graph.

At S4, feature extraction is performed on the sky satellite graph based on a Transformer model with a graph-structure perception module, and a position correction value is output.

At S5, the initial positioning result and the position correction value are combined to obtain a final positioning result.

In some possible embodiments, the S1 further comprises the following step.

The measurement data are normalized.

Specifically, due to the potential large numerical differences between different features, it is necessary to normalize or standardize some of the data.

Since the LOS vector has a large value, it needs to be normalized, and the specific formula is:

$$LOS_{normalization} = \left\{ \frac{x}{\sqrt{x^2+y^2+z^2}}, \frac{y}{\sqrt{x^2+y^2+z^2}}, \frac{z}{\sqrt{x^2+y^2+z^2}} \right\}, \quad (1)$$

where x, y, and z are components of the corresponding coordinate axes of LOS vector in an earth-centered, earth-fixed (ECEF) coordinate system.

In addition, in the embodiment, to address the issue of significant variations in pseudorange residual values across satellite measurements from different locations or epochs, the pseudorange residuals within the node features of each graph are normalized to stabilize the pseudorange residual values of all input data to the learning network between 0 and 1, thereby improving the stability of model training.

In some possible embodiments, the S1 further comprises the following step.

The measurement data is filtered.

Specifically, the satellite data may also be filtered before positioning, using criteria such as carrier frequency error, elevation angle, C/NO, and multipath effects, to obtain data with better signal quality.

In some possible implementations, the S2 specifically comprises the following steps.

In S2 of the present disclosure, the satellite measurement data is solved using a Kalman filtering method to obtain an initial positioning result; the calculation process involves the state equation and measurement equation.

At S2.1, prediction for the next moment is performed based on a dynamic model to obtain a predicted position.

In the positioning task, the Kalman filter performs iterative calculation on the data, which may be specifically divided into a prediction stage and an update stage. The prediction stage formula is as follows:

$$\begin{cases} \hat{x}_{\bar{k}} = A_k \hat{x}_{k-1} + B_k u_k \\ P_{\bar{k}} = A_k P_{k-1} A_k^T + Z \end{cases}, \quad (2)$$

where $\hat{x}_{\bar{k}}$ represents a predicted position at moment k; $A_k$ represents a state transition matrix at moment k; $\hat{x}_{k-1}$ represents a position at moment k−1; $B_k$ represents a control variable matrix at moment k; $u_k$ represents a state control vector at moment k; $P_{\bar{k}}$ represents an MSE matrix; $P_{k-1}$ represents a covariance of $\hat{x}_{k-1}$; $A_k^T$ represents a transpose of $A_k$; and Z represents a system noise covariance matrix.

At S2.2, an MSE matrix between the predicted position and the true position is calculated.

The dynamic model of the system (e.g. the pseudorange linearized positioning equations of the receiver) is used to predict the position at the next moment, and then the MSE matrix between the predicted position and the true position is calculated to represent the uncertainty of the predicted position upon receiving the actual measured value.

At S2.3, the actual measured value is acquired.

At S2.4, the predicted position is adjusted using a Kalman filter based on the MSE matrix and the actual measured value.

Upon receiving the actual measured value, the Kalman filter update step may be used to adjust the predicted position.

$$\begin{cases} L_k = P_{\bar{k}} H_k^T (H_k P_{\bar{k}} H_k^T + R)^{-1} \\ \hat{x}_k = \hat{x}_{\bar{k}} + L_k (z_k - H_k \hat{x}_{\bar{k}}) \\ P_k = P_{\bar{k}} - L_k H_k P_{\bar{k}} \end{cases}, \quad (3)$$

where $L_k$ represents a Kalman gain; $P_k$ represents an updated MSE matrix; $H_k$ represents a conversion matrix from a state vector to a measurement vector; $H_k^T$ represents a transpose of $H_k$; R represents a measurement noise covariance matrix; $x_k$ represents a state vector; and $z_k$ represents an actual measured value. The Kalman gain is updated first, where it is chosen as the gain matrix because it minimizes the MSE matrix. The role of the Kalman gain is to balance the predicted value and measured value, the magnitude of which depends on the relative sizes of the prediction error covariance and the measurement noise covariance. The predicted value is then adjusted using the Kalman gain; it can be seen that the greater the Kalman gain, the greater the influence of the measured value on the final estimated value. Finally, the new MSE matrix is calculated using Kalman gain.

In some possible embodiments, the graph-based data modeling in S3 specifically comprises the following steps.

(1) For the satellite measurement data received at a certain moment from different constellations (including the GPS, Galileo system, and Russian GLONASS system, along with their corresponding frequencies), a sky satellite graph is proposed. Each satellite position is treated as a node in the graph, and pre-selected data features are concatenated as the node features of the sky satellite graph.

The pre-selected data features comprise PR, C/N0, and LOS vectors. As the first input of the graph, the set of all the node features in the graph is a node feature matrix $X \in R^{N \times D}$, where the dimension of the representation matrix for $R^{N \times D}$ is N×D); N represents the number of satellites receiving signals by a receiver at a certain position; and D represents the dimension of each satellite node feature, with D=5.

(2) An adjacency matrix describing spatial structure information of the graph is constructed as edges of the sky satellite graph based on a cosine similarity-based edge construction method.

For each graph, an adjacency matrix describing spatial structure information of the graph $Adj \in R^{N \times N}$ further needs to be constructed. The definition method of the adjacency matrix is as follows: An edge construction method based on cosine similarity, which does not consider the constellation affiliation of satellite nodes in the satellite graph, but instead focuses on the directional similarity between satellite vectors at the nodes, without taking into account the magnitude of specific features. Specifically, when constructing the graph from satellite measurement data, there may be significant variations in signal strength for satellites at different positions due to factors such as atmospheric interference, multipath effects, or satellite clock errors. However, cosine similarity can capture the inherent directional nature of satellite measurements, without being affected by the scale of the measurements themselves. It is calculated as follows:

$$\text{similarity}(s_i, s_j) = \frac{s_i \cdot s_j}{\|s_i\| \|s_j\|}, \quad (4)$$

where $s_i$ and $s_j$ are different satellite measurement vectors, the structure of which is S=[PR LOS C/N0].

In addition, based on the node features and edge construction methods described in (1) and (2), the graph data processing library provided by PyTorch (PyTorch Geometric) is used to construct the graph data input for the model and the corresponding dataset.

In the GNSS positioning task, the visibility of different satellites changes with the measurement position and time. Therefore, for measured values collected at the same location, which include different numbers and orders of satellites, the same output is to be obtained when inputting the measured values into the learning network. However, general neural networks can only learn input features of equal length and consistent order. Therefore, in the present disclosure, the satellite signals received by a given receiver are used to construct graph data, and a graph structure processing neural network is employed for feature extraction, with the graph construction method as described above.

In some possible embodiments, S4 specifically comprises the following steps.

At S4.1, Laplace positional encoding is performed based on an adjacency matrix of the sky satellite graph.

At S4.2, the Laplace positional encoding is fused with the node features of the sky satellite graph.

Laplace positional encoding is as follows: For the constructed sky satellite graph, the node feature matrix and adjacency matrix are primarily used. The adjacency matrix and degree matrix are employed to obtain the Laplace matrix, which is then subjected to spectral decomposition to obtain the eigenvalues and eigenvectors. Finally, the required number of eigenvalues and eigenvectors are selected and combined based on the desired positional encoding dimension to obtain the corresponding positional encoding. The node features and the corresponding Laplace positional encoding are linearly expanded and added as the input of the Transformer block, and the details are as follows:

$$\begin{cases} \hat{h}_i^0 = A^0 m_i + \alpha^0 \\ \lambda_i^0 = C^0 \lambda_i + c^0 , \\ h_0 = \hat{h}_i^0 + \lambda_i^0 \end{cases} \quad (5)$$

where $m_i$ is an i-th node feature in the graph;

$$\hat{h}_i^0$$

represents the node feature after the dimension expansion; $\lambda_i$ represents the Laplace positional encoding corresponding to the i-th node feature in the graph; $\lambda_i^0$ represents positional encoding after the dimension expansion; and $h_0$ represents an input of a first layer of Transformer. The positional encoding is only added to the input feature of the first layer; in addition, $A^0$, $C^0$, $c^0$, and $\alpha^0$ are parameters to be trained.

At S4.3, graph local structure learning is performed on the sky satellite graph based on the graph-structure perception module to obtain updated node features.

Specifically, to give the Attention block with attention scores that better capture graph structure expression ability, this part uses subgraph-based extraction and GNN-based subgraph learning to learn the graph node features used to calculate attention score to make it more capable of local structure expression. The specific process and explanations are as follows.

For the graph input to the graph-structure perception module, each node in the graph is taken as a central node. A subgraph corresponding to each central node is extracted using 2-hop sampling (i.e., nodes that can be reached within two steps from the central node). An inductive graph learning GNN model, GraphSAGE, is then used to learn the extracted subgraph based on its node aggregation strategy to obtain a graph representation of the subgraph. The result obtained from graph pooling is then used as the updated central node representation.

GraphSAGE is a graph neural network model that uses inductive learning, and the processing of the input graph is divided into three steps: first, the neighborhood of a node is sampled to obtain neighboring nodes for aggregation; then, feature information is aggregated from the neighboring nodes; and finally, the node representation of the graph is updated. As an inductive learning model, GraphSAGE has the advantage of focusing on potential patterns in learning data. After the training is completed, there is a better processing effect on the graph or node features never seen.

At S4.4, the position correction value is output by a Transformer graph feature extraction module based on relationships between the updated node features.

Based on the processing in steps S4.1 to S4.3, which adds Laplace positional encoding and graph local structure learning to the input graph, the node features now contain structural information about the input graph. At S4.4, the Attention block in the Transformer graph feature extraction module is used to focus on the potential representations between the nodes of the spatial satellite graph.

Figure 2:
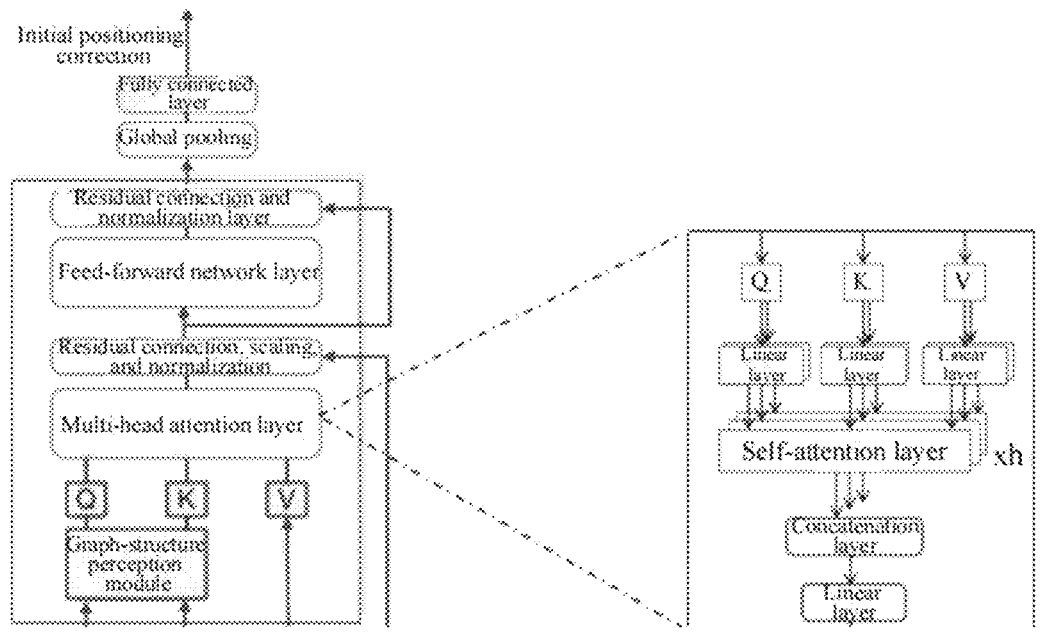
FIG. 2 is a structural diagram of a Transformer model of a graph-structure perception module according to an embodiment of the present disclosure.

In the present disclosure, a Laplace positional encoding capable of expressing graph structure information and a GNN model-based structure perception module based on capable of learning a partial representation of a graph are added based on Transformer, to maximize the learning of the model of node feature information of the input graph and structure information between nodes. Furthermore, the structure and data flow direction of the Transformer model with the graph-structure perception module refer to FIG. 2.

In some possible embodiments, S4.4 specifically comprises the following steps.

At S4.4.1, the relationships between the updated node features are learned from multiple perspectives based on a multi-head attention mechanism layer to obtain output results of the multi-head attention.

The input node features, after undergoing the previous processing, are fed into a multi-head attention mechanism layer. The multi-head attention mechanism layer is built upon a self-attention mechanism layer, and the formula for the self-attention mechanism is as follows:

$$\text{Attention}(Q, K, V) = \text{softmax}\left(\frac{QK}{\sqrt{d_k}}\right)V, \quad (6)$$

where $Q=W^Q x^*$, $K=W^K X^*$, and $V=W^V X$; X represents a node feature matrix of a constructed sky satellite graph; X* represents a node feature matrix processed by a graph-structure perception module; $W^Q$, $W^K$, and $W^V$ represent weights of the corresponding matrices; Q, K, and V represent projections of X in different directions. An inner product is made on Q and K to obtain a corresponding correlation score matrix, and the attention graph between graph nodes may be obtained by making the inner product on the result and V, where $\sqrt{d_k}$ is a scaling factor, for scaling the inner product of Q and K when the length of an input feature matrix is large to smooth the network output to obtain a more suitable attention score matrix.

In addition, to capture the relationships between input node features from multiple perspectives, a plurality of self-attention mechanism networks are combined to form a multi-head attention layer. The number of self-attention layers is h; if the sequence length of Q, K, and V is m, the data is projected to the m/h-dimensional low-dimensional space before calculation, then each head is processed, and finally the processed results are re-concatenated together to obtain the output result of multi-head attention through a linear layer.

At S4.4.2, the output results of the multi-head attention are successively passed through a residual connection, a normalization layer, and an intermediate feed-forward network to obtain outputs of a Transformer unit.

In the residual connection part, the present disclosure also takes into account the influence of node degree, which helps avoid the excessive impact of highly connected nodes on the node features during the computation, thereby allowing the network to more evenly consider all nodes and connections. The output of the Transformer layer is then obtained through two normalization layers and an intermediate feed-forward network (FFN) layer, which includes two fully connected layers and an intermediate activation function layer.

At S4.4.3, the outputs of the Transformer unit are stacked before successively passing through global pooling and a fully connected layer, to output the position correction value.

Finally, a plurality of structure perception Transformer units are stacked together, and then a final position correction is obtained through global pooling and a fully connected layer. The global pooling is used to aggregate the output graph node representations into graph representations, allowing the fully connected layer to transform the input graph into 3-dimensional (3D) position correction coordinates.

In some possible embodiments, the method further comprises the following step.

The Transformer model with the graph-structure perception module is pre-trained.

Specifically, in the previous embodiments, a GNSS high-precision positioning correction model, namely, the Transformer model with a graph-structure perception module of the present disclosure is introduced. Based on this, a gradient descent algorithm is used for training, comprising the following specific training step.

An object of the present disclosure is to use multi-constellation satellite signal feature information received from a receiver and position information between different satellite points in a sky satellite graph to perform positioning position correction on an initial positioning result of a Kalman filter, so that an output label of a model is a 3D position correction result, and an input of the model is constructed graph data.

According to the constructed graph structure perception Transformer model, the hyperparameters to be determined are the dimension of Laplace positional encoding, the step size of subgraph extraction in the subgraph extraction module and the step size when the subgraph is aggregated by the GraphSAGE model, the number of layers of the Transformer module and the number of corresponding multi-head attention modules, the number of layers in each fully connected time network and the number of neurons in a hidden layer.

The experiment uses the Adam optimizer, which features an adaptive learning rate. The Adam optimizer dynamically adjusts the learning rate for each parameter using a first moment estimate and a second moment estimate of the gradient. Through bias correction, it is ensured that the learning rate in each iteration remains within a certain range, allowing for smoother parameter updates.

The present disclosure is a regression task, and the loss function used is an MSE for judging the degree of similarity between the predicted output of a model and a true value. The calculation formula thereof is as follows:

$$MSELoss(A, Y) = \frac{1}{num \cdot C} \sum_{i=1}^{num} \sum_{j=1}^{c} (A_{ij} - Y_{ij})^2, \quad (7)$$

where A represents a model predicted value; Y represents a true value; num is the number of samples in a batch; C represents an output dimension of each sample; i and j are indexes used to traverse the data. The closer the predicted value of the model output is to the real value to the true value, the closer Loss to zero, and the better the training effect.

The total training round M of the model is set, and back propagation (BP) is used to update the weight values and biases of the model during the training. The update formula is as follows:

$$w^{n+1} \leftarrow w^n - a\nabla L(w) \quad (8),$$

$$b^{n+1} \leftarrow b_n - a\nabla L(b) \quad (9),$$

where $w^{n+1}$ represents a weight of a n+1 round; $w^n$ represents a weight of an n-th round; $b^{n+1}$ represents a bias of an (n+1)-th round; $b^n$ represents a bias of the n-th round; a represents a learning rate; and $\nabla L(\cdot)$ represents a gradient of a loss function to a model parameter.

Based on the above steps, the model is trained in a supervised manner using the error between the predicted value and the true value of the initial positioning. When the number of iteration rounds reaches the set maximum value, the training process is completed, and the model is saved. The model may then be used with the positioning chip after achieving good results on various test sets.

Based on the above solution, it can be seen that the high-precision positioning method of the present disclosure is applicable to a complex environment, and the detailed reasoning therefor is as follows.

1. Considering that the number and order of satellites in the satellite measurements received by a receiver at different positions and times may vary due to environmental changes, the present disclosure models the sky satellite graph based on the different numbers of multi-constellation satellite measurements received by the receiver at a given moment. At the same time, to account for the quality impact of different satellite measurements, a C/NO value representing the reliability of satellite measurements is added to the node features of the graph. Additionally, in the process of constructing the graph, an edge construction method based on cosine similarity is employed, which strengthens the connections between nodes while reducing the number of edges in the graph. This results in a sparser graph, thereby reducing the computational complexity of the model during structure perception learning.

2. By adding Laplace positional encoding to the node features before inputting into the Transformer, the constructed graph topology information is integrated into the node features, allowing the model to better perceive the position of the satellite nodes in the graph and capture the interrelationships and dependencies between nodes.

3. The present disclosure proposes a Transformer network that perceives and learns the graph structure, combining the advantages of the GNN model and the messaging capability of the Transformer model to extract the representation of the input graph. After adding Laplace positional encoding to the nodes, the network first learns the local structure representation of the nodes in the satellite graph using the GNN's ability to aggregate neighboring nodes, and integrates this into the original attention. Then, a graph representation with both local features and global features is obtained through the global learning capability of the attention mechanism.

In summary, in the present disclosure, for the construction of graph data, C/NO is added to the satellite graph nodes as node features to enhance the expressive capability of the satellite nodes. The method based on cosine similarity is used to construct edges, which is not constrained by satellite measurement values, and captures the inherent directionality of measurements from the perspective of satellite measurement vectors, unaffected by the measurements themselves. This not only strengthens the connections between nodes in the constructed graph but also makes the graph sparser, leading to faster model computation. Transformer with graph structure perception is used to process the input graph in the model. By adding Laplace positional encoding and a graph structure extractor before calculating the attention scores, the Transformer layer can more comprehensively learn both the local features and global features of the input graph, resulting in a better graph representation. Compared to methods that directly use a GNN network for processing, the Transformer model with graph structure perception has a stronger ability to express the sky satellite graph, can better handle unseen data in complex and dynamic environments, and exhibits better generalization.

Figure 3:
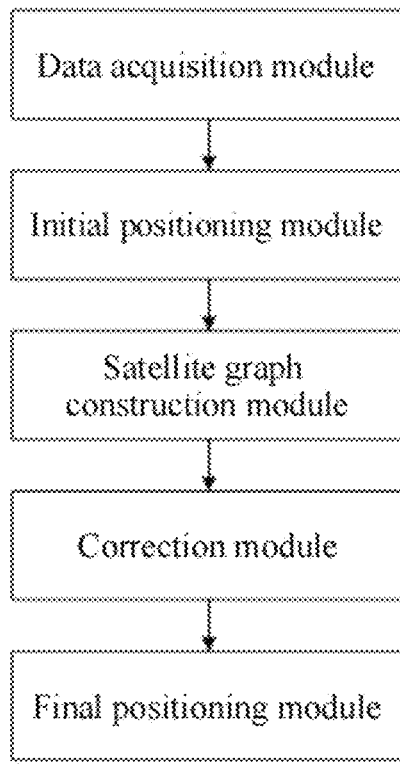
FIG. 3 is a block diagram of a high-precision BeiDou satellite positioning system for a complex urban environment according to the present disclosure.

As shown in FIG. 3, a high-precision BeiDou satellite positioning system for a complex urban environment comprises:
- a data acquisition module, configured to acquire measurement data;
- an initial positioning module, configured to perform calculation processing on the measurement data based on Kalman filtering before predicting to obtain an initial positioning result;
- a satellite graph construction module, configured to perform graph-based data modeling based on the measurement data to obtain a sky satellite graph,
- a correction module, configured to perform feature extraction on the sky satellite graph based on a Transformer model with a graph-structure perception module, and output a position correction value; and
- a final positioning module, configured to combine the initial positioning result and the position correction value to obtain a final positioning result.

The content of the above method embodiments is applicable to the system embodiment. The functions specifically realized by the system embodiment are the same as those of the above method embodiment, and the beneficial effects achieved by the system embodiment are the same as those achieved by the above method embodiment.

A high-precision BeiDou satellite positioning apparatus for a complex urban environment comprises:
- at least one processor; and
- at least one memory, configured to store at least a program.

The at least one program, when executed by the at least one processor, causes the at least one processor to implement the high-precision BeiDou satellite positioning method for a complex urban environment.

The content of the above method embodiments is applicable to the apparatus embodiment. The functions specifically realized by the apparatus embodiment are the same as those of the above method embodiment, and the beneficial effects achieved by the apparatus embodiment are the same as those achieved by the above method embodiment.

A storage medium storing therein processor-executable instructions is provided. The processor-executable instructions, when executed by a processor, are used to implement the high-precision BeiDou satellite positioning method for a complex urban environment.

The content of the above method embodiments is applicable to the storage medium embodiment. The functions specifically realized by the storage medium embodiment are the same as those of the above method embodiment, and the beneficial effects achieved by the storage medium embodiment are the same as those achieved by the above method embodiment.

Although the preferred embodiments of the present disclosure have been specifically described, the present disclosure is not limited to these embodiments. Those skilled in the art may make various equivalent modifications or substitutions without departing from the spirit of the present disclosure, and such equivalent modifications or substitutions are included within the scope defined by the claims of the present disclosure.

The invention claimed is:

1. A high-precision BeiDou satellite positioning method for a complex urban environment, comprising the following steps:
   acquiring measurement data,
   performing calculation processing on the measurement data based on Kalman filtering before predicting to obtain an initial positioning result,
   performing graph-based data modeling based on the measurement data to obtain a sky satellite graph,
   performing feature extraction on the sky satellite graph based on a Transformer model with a graph-structure perception module, and outputting a position correction value, and
   combining the initial positioning result and the position correction value to obtain a final positioning result, wherein
   the graph-based data modeling specifically comprises:
   proposing the sky satellite graph for satellite measurement data from different constellations received by a receiver at a certain moment;
   taking a position of each satellite as a node in the graph, and concatenating pre-selected data features as node features of the sky satellite graph; and
   constructing, based on a cosine similarity-based edge construction method, an adjacency matrix describing spatial structure information of the graph as edges of the sky satellite graph.

2. The high-precision BeiDou satellite positioning method for the complex urban environment according to claim 1, further comprising:
   filtering the measurement data.

3. The high-precision BeiDou satellite positioning method for the complex urban environment according to claim 1, wherein performing calculation processing on the measurement data based on Kalman filtering before predicting to obtain the initial positioning result specifically comprises:
   performing prediction for a next moment based on a dynamic model to obtain a predicted position;
   constructing a mean-square error (MSE) matrix based on the predicted position;
   acquiring an actual measured value; and
   adjusting, based on the MSE matrix and the actual measured value, the predicted position using a Kalman filter to obtain the initial positioning result.

4. The high-precision BeiDou satellite positioning method for the complex urban environment according to claim 1, wherein the pre-selected data features comprise pseudorange residuals (PR), carrier signal-to-noise ratios (C/NO), and unitized line-of-sight (LOS) vectors.

5. The high-precision BeiDou satellite positioning method for the complex urban environment according to claim 1, wherein performing feature extraction on the sky satellite graph based on the Transformer model with the graph-structure perception module, and outputting the position correction value specifically comprise:
   performing Laplace positional encoding based on an adjacency matrix of the sky satellite graph;
   fusing the Laplace positional encoding with the node features of the sky satellite graph;
   performing graph local structure learning on the sky satellite graph based on the graph-structure perception module to obtain updated node features; and
   outputting, by a Transformer graph feature extraction module, the position correction value based on relationships between the updated node features.

6. The high-precision BeiDou satellite positioning method for the complex urban environment according to claim 5, wherein outputting, by the Transformer graph feature extraction module, the position correction value based on the relationships between the updated node features specifically comprises:
   learning the relationships between the updated node features from multiple perspectives based on a multi-head attention mechanism layer to obtain output results of the multi-head attention;
   successively passing the output results of the multi-head attention through a residual connection, a normalization layer, and an intermediate feed-forward network to obtain outputs of a Transformer unit; and
   stacking the outputs of the Transformer unit before successively passing through global pooling and a fully connected layer, to output the position correction value.

7. The high-precision BeiDou satellite positioning method for the complex urban environment according to claim 5, further comprising:
   pre-training the Transformer model with the graph-structure perception module.

8. A high-precision BeiDou satellite positioning system for a complex urban environment, comprising:
   a data acquisition module, configured to acquire measurement data;
   an initial positioning module, configured to perform calculation processing on the measurement data based on Kalman filtering before predicting to obtain an initial positioning result;
   a satellite graph construction module, configured to perform graph-based data modeling based on the measurement data to obtain a sky satellite graph,
   the graph-based data modeling specifically comprising:
   proposing the sky satellite graph for satellite measurement data from different constellations received by a receiver at a certain moment; taking a position of each satellite as a node in the graph, and concatenating pre-selected data features as node features of the sky satellite graph; and constructing, based on a cosine similarity-based edge construction method, an adjacency matrix describing spatial structure information of the graph as edges of the sky satellite graph;
   a correction module, configured to perform feature extraction on the sky satellite graph based on a Transformer model with a graph-structure perception module, and output a position correction value; and a final positioning module, configured to combine the initial positioning result and the position correction value to obtain a final positioning result.

\* \* \* \* \*